United States Patent
Black et al.

(10) Patent No.: US 9,306,613 B2
(45) Date of Patent: Apr. 5, 2016

(54) VARIABLE ANTENNA MATCH LINEARITY

(71) Applicant: Google Technology Holdings LLC, Mountain View, CA (US)

(72) Inventors: Gregory R. Black, Vernon Hills, IL (US); John P. Boos, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 406 days.

(21) Appl. No.: 13/738,087

(22) Filed: Jan. 10, 2013

(65) Prior Publication Data

US 2014/0194075 A1 Jul. 10, 2014

(51) Int. Cl.
| | | |
|---|---|---|
| H04B 1/44 | (2006.01) | |
| H04B 1/40 | (2015.01) | |
| H04B 1/04 | (2006.01) | |
| H04B 1/403 | (2015.01) | |
| H04B 1/525 | (2015.01) | |

(52) U.S. Cl.
CPC ................. *H04B 1/40* (2013.01); *H04B 1/0458* (2013.01); *H04B 1/406* (2013.01); *H04B 1/525* (2013.01)

(58) Field of Classification Search
CPC .............. H04B 1/48; H04B 1/44; H04B 1/52; H04B 1/406; H04B 1/525; H04B 1/005; H04B 1/0057; H04W 88/06; H04W 88/02
USPC ............... 455/75–79, 83, 550.1, 552.1, 553.1
See application file for complete search history.

(56) References Cited

U.S. PATENT DOCUMENTS

| | | |
|---|---|---|
| 5,867,127 A | 2/1999 | Black et al. |
| 6,026,285 A | 2/2000 | Lyall, Jr. et al. |
| 6,356,536 B1 | 3/2002 | Repke |
| 6,459,885 B1 * | 10/2002 | Burgess .................... 455/83 |
| 7,010,274 B2 | 3/2006 | Choi |
| 7,043,285 B2 | 5/2006 | Boyle |
| 7,075,386 B2 | 7/2006 | Kearns |
| 7,123,884 B2 | 10/2006 | Nakakubo et al. |
| 7,251,459 B2 | 7/2007 | McFarland et al. |

(Continued)

FOREIGN PATENT DOCUMENTS

| | | |
|---|---|---|
| EP | 1265370 A1 | 12/2002 |
| EP | 1418680 A1 | 5/2004 |
| EP | 1826914 A1 | 8/2007 |
| WO | 2013016088 A1 | 1/2013 |

OTHER PUBLICATIONS

Caverly, Robert H. et al.: "Distortion in p-i-n. Diode Control Circuits", IEEE Transactions on Microwave Theory and Techniques, vol. MTT-35, No. 5, May 1987, pp. 492-501.

(Continued)

*Primary Examiner* — Nhan Le
(74) *Attorney, Agent, or Firm* — Faegre Baker Daniels LLP

(57) ABSTRACT

In embodiments of variable antenna match linearity, a wireless device includes a first transceiver and a second transceiver, an antenna via which signals are received, and a linearity controller that varies a linearity of an antenna match circuit associated with the antenna. The linearity controller can determine whether a frequency of an intermodulated signal that includes transmissions from the first and second transceivers is within one of a respective receive band of the first transceiver or the second transceiver. The linearity controller can increase a linearity of the antenna match circuit to mitigate an amplitude of the intermodulated signal in the receive band.

13 Claims, 6 Drawing Sheets

(56) References Cited

U.S. PATENT DOCUMENTS

| | | |
|---|---|---|
| 7,262,657 B2 | 8/2007 | Nellis et al. |
| 7,391,283 B2 | 6/2008 | Kearns |
| 7,499,678 B2 | 3/2009 | Shibagaki et al. |
| 7,583,950 B2 | 9/2009 | Russell et al. |
| 7,589,602 B2 | 9/2009 | Poveda et al. |
| 7,787,831 B2 | 8/2010 | Uejima et al. |
| 7,865,150 B2 | 1/2011 | McFarland et al. |
| 7,904,031 B2 | 3/2011 | Furutani et al. |
| 8,019,289 B2 * | 9/2011 | Gorbachov ............... 455/83 |
| 2002/0025785 A1 | 2/2002 | Satoh et al. |
| 2003/0207668 A1 | 11/2003 | McFarland et al. |
| 2005/0035824 A1 | 2/2005 | Kearns |
| 2009/0318087 A1 | 12/2009 | Mattila et al. |
| 2010/0069020 A1 | 3/2010 | Koya et al. |
| 2011/0292844 A1 | 12/2011 | Kwun et al. |
| 2013/0028147 A1 | 1/2013 | Black |

OTHER PUBLICATIONS

Caverly, Robert H. et al.: "Distortion in Microwave and Switches by Reverse Biased PIN Diodes", 1989 IEEE MTT-S Digest, CH2725-0/89/0000-1073$01.00, pp. 1073-1076.

European Patent Office, International Search Report and Written Opinion for PCT Application No. PCT/US2014/010169, mailed Jul. 4, 2014.

Patent Cooperation Treaty, International Search Report and Written Opinion of the International Searching Authority for International Application No. PCT/US2012/047116, Nov. 23, 2012, 12 pages.

United States Patent and Trademark Office, "Notice of Allowance and Fee(s) Due" for U.S. Appl. No. 13/190,893 dated Sep. 20, 2013, 9 pages.

Patent Cooperation Treaty, Invitation to Pay Additional Fees and, Where Applicable, Protest Fee, Mar. 20, 2014, PCT/US2014/010169, all pages.

* cited by examiner

VARIABLE ANTENNA MATCH LINEARITY

FIELD OF THE INVENTION

The embodiments described herein relate in general to wireless communication systems, and more specifically to a method and apparatus for varying antenna match circuit linearity in multi-transmitter devices.

BACKGROUND

Many wireless electronic devices, such as mobile phones, tablet computers, laptop computers, and portable media devices, often employ multiple transceivers for communicating over different wireless networks or frequency bands. Each of the wireless transceivers is typically associated with one or more respective antennas through which signals are transmitted or received. Relative to other components of an electronic device, these antennas often occupy considerable physical volume of the electronic device. Antenna match tuning, however, permits use of narrower-band antennas that consume less physical volume, allowing for the development of smaller electronic devices. Additionally, match tuning circuits may be implemented using inexpensive components, such as PIN diodes, which are simple, consume little current, and provide acceptable linearity.

When two transceivers transmit signals concurrently (e.g., during a multi-transmitter mode), the transmitted signals may intermodulate in the match tuning circuit associated with a receiver. For signals transmitted in proximate or adjacent frequency bands, this intermodulated signal may be substantial in match tuning circuits based on PIN diodes. When a frequency of this intermodulated signal is within a receive band of a receiver associated with the match circuit, the intermodulated signal may desensitize or block the receiver. Other match tuning solutions, such as integrated-circuit or micro-electromechanical based match tuners, may be less susceptible to intermodulation between two transmitted signals. However, these other match tuning solutions are expensive, complex, and/or constantly draw high levels of current, which can increase design costs or degrade battery performance of a wireless device.

BRIEF DESCRIPTION OF THE DRAWINGS

Embodiments of variable antenna match linearity are described with reference to the following drawings. The same numbers are used throughout the drawings to reference like features and components.

DETAILED DESCRIPTION

In embodiments of variable antenna match linearity, a wireless device includes multiple transceivers that communicate over respective wireless networks or frequency bands. These multiple transceivers may enter a multi-transmitter mode during which two of the transceivers transmit concurrently. For example, a wireless device communicating in accordance with the long term evolution (LTE) cellular standard may concurrently transmit, via respective transceivers, voice data in a first frequency band and non-voice data in a second frequency band. As described above, signals of concurrent transmissions may produce substantial intermodulation in a match tuning circuit having low linearity. Other match tuners may have sufficiently high linearity to reduce the intermodulation, but components of these match tuners are often complex, expensive, or constantly consume current. Embodiments of variable antenna match linearity provide an on-demand increase in linearity of a match tuning circuit to mitigate the intermodulation during multi-transmitter operation, and to conserve power of a wireless device during times when lower linearity is acceptable.

When a wireless device enters a multi-transmitter mode, transmissions of a first transceiver and a second transceiver may be received as feedback via an antenna of the wireless device. The transmissions of the first transceiver and the second transceiver may intermodulate and produce an intermodulated signal. It can be determined whether a frequency of the intermodulated signal is within one of a respective receive band of the first transceiver or the second transceiver. For example, when the first transceiver transmits in long term evolution (LTE) band 5 and the second transceiver transmits in LTE band 13, an intermodulated signal is generated at frequencies within respective LTE receive bands of the first and second transceivers. A linearity of an antenna match circuit associated with the antenna is then increased to mitigate an amplitude of the intermodulated signal in the receive band. Increasing a level of bias current applied to a PIN diode of the antenna match circuit, for example, can increase the linearity of the antenna match circuit. This may prevent a receiver of the first transceiver or the second transceiver from being desensitized or blocked during multi-transmitter operation, and enables power conservation during other modes of transceiver operation.

While features and concepts of the described variable antenna match linearity can be implemented in any number of different devices, systems, and/or configurations, embodiments of variable antenna match linearity are described in the context of the following example devices, systems, and methods.

Figure 1:
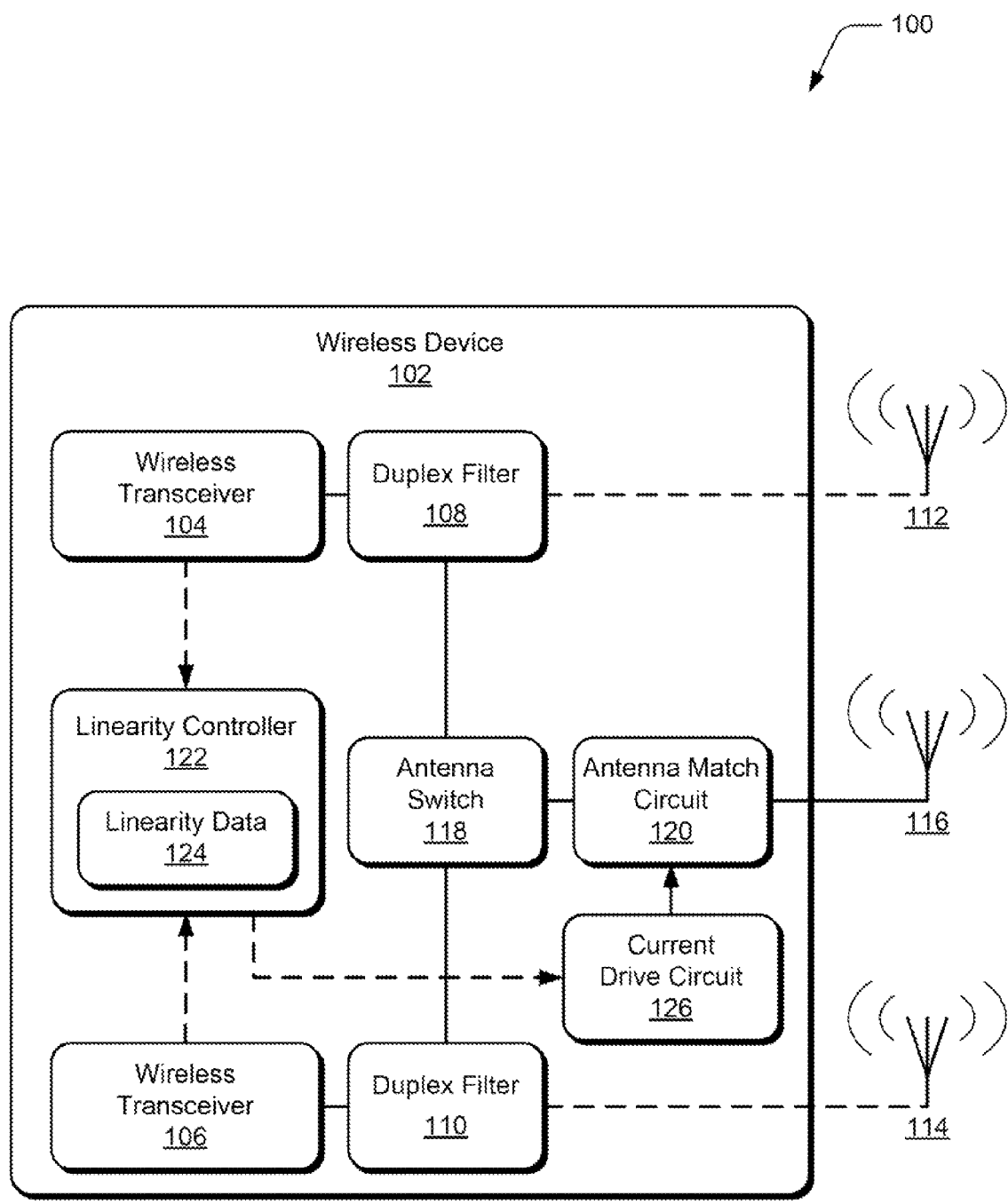
FIG. 1 illustrates an example system in which embodiments of variable antenna match linearity can be implemented.

FIG. 1 illustrates an example system 100 in which embodiments of variable antenna match linearity can be implemented. The example system 100 includes a wireless device 102 that may be any type of portable electronic device, such as a mobile phone, tablet computer, handheld navigation device, portable gaming device, and/or portable media playback device. The wireless device may also be any type of device as further described with reference to the example electronic device shown in FIG. 7. The wireless device 102 includes a first wireless transceiver 104 (transceiver 104) and a second wireless transceiver 106 (transceiver 106), each of which is capable of communicating data over a respective wireless network or set of frequency bands. Transceiver 104 and/or transceiver 106 may each be implemented as a combined transceiver (shown), or implemented separately as a respective transmitter and receiver pair (not shown).

The wireless transceivers 104 and 106 may be configured (similarly or differently) for communication in accordance with any suitable communication protocol or standard, such as third generation partnership project (3GPP) long term evolution (LTE), code division multiple access (CDMA) 1xRTT, CDMA evolution-data optimized (EVDO), global systems for mobile communication (GSM), wideband CDMA (WCDMA), universal mobile telecommunications systems (UMTS), and the like. Each communication standard or protocol defines a set of frequency bands, which may be divided into transmit (uplink) frequency bands and receive (downlink) frequency bands. In this example, the transceiver 104 is implemented to communicate in accordance with the CDMA (e.g., 1xRTT or EVDO) standard and the transceiver 106 is implemented to communicate in accordance with the LTE standard. An example of a network environment in which the transceivers 104 and 106 communicate is described with reference to FIG. 2. In some embodiments, the transceiver 104 and/or the transceiver 106 may be configurable via software or firmware to communicate in accordance with any of the multiple communication protocols or standards.

The wireless device 102 also includes a duplex filter 108 and a duplex filter 110, through which the transceiver 104 and the transceiver 106 may communicate via antenna 112 and antenna 114, respectively. The duplex filters 108 and 110 can be implemented to provide isolation between transmitted signals and received signals of a respective transceiver. In this example, the transceiver 104 transmits signals via the antenna 112 and the transceiver 106 transmits signals via the antenna 114. Alternatively, the transceiver 104 and/or the transceiver 106 is capable of receiving via another antenna 116, which may be operably connected to either of the transceivers by an antenna signal combiner or switch 118. The antenna signal combiner or switch 118 can arbitrate connectivity of the antenna 116 based on respective operational modes of the first and second transceivers 104 and 106, which may include any of a transmission mode, receive mode, idle mode, non-transmission mode, and so on. The antenna 116 is tuned for communication in one or more frequency bands by an antenna match circuit 120, which may include various passive and/or active components. Alternative embodiment antennas 112 and 114 can also be tuned for communication in one or more frequency bands by antenna match circuits (not shown), which may include various passive and/or active components. An example implementation of an antenna match circuit is described with reference to FIGS. 3 and 4.

When the transceiver 104 or the transceiver 106 transmit, a receiver of a transceiver may be blocked or desensitized when a transmit frequency band of one transceiver overlaps with a receive frequency band of the other transceiver. Receiver de-sensing or blocking may also occur when transceivers are configured to transmit and receive in different frequency bands, for example if a spurious signal from a transmitter occurs within the frequency band of a receiver the receiver may be desensitized. For example, when the transceiver 104 and the transceiver 106 concurrently transmit, the transmit signals may intermodulate within an antenna match circuit, such as the antenna match circuit 120, due to non-linearities. These non-linearities may result in the antenna match circuit 120 having a third-order intercept point (IP3) at which intermodulated signals are produced with significant amplitudes. These intermodulated signals (e.g., third-order harmonics) may be within a respective frequency band of a receiver and block or desensitize the receiver.

The wireless device 102 also includes a linearity controller 122 that is implemented to vary a linearity of the antenna match circuit 120 based on respective operational modes of the first transceiver 104 and/or the second transceiver 106. In some cases, increasing a linearity of the antenna match circuit 120 may decrease an amplitude of intermodulated signals effective to prevent receiver de-sensing or blocking. In this example, the linearity controller 122 is implemented separate from the first and second transceivers 104 and 106, and may by implemented as processor executable instructions embodied on a computer-readable memory device that also includes linearity data 124. Linearity data 124 may be useful to determine when, and to what degree, the linearity of the antenna match circuit 120 is varied. For example, the linearity data 124 may include parameters for varying the linearity of the antenna match circuit 120 based on respective operational modes or states of the transceiver 104 and/or the transceiver 106. These parameters may be based on settings associated with an operational mode or transceiver characteristics, such as transmit channel frequency, transmitter amplitude, receive channel frequency, or a minimum level of reception of a receiver, i.e. a minimum sensitivity of the receiver. In one embodiment, if the linearity data 124 indicates that transmit frequencies are such that an intermodulation distortion signal occurs at a receive channel frequency, and the transmit levels are such that an amplitude of the intermodulation distortion signal causes an increase in a minimum receiver sensitivity, then the linearity controller 122 increases a linearity of the antenna match circuit 120. The linearity controller 122 may be integrated in a system-on-chip (SoC) with other components and/or logic of the wireless device, or alternatively, may be implemented as software or firmware executed by a baseband processor of the transceiver 104 and/or the transceiver 106.

In some embodiments, the linearity controller 122 can control a level of bias current that a current drive circuit 126 (drive circuit 126) applies to the antenna match circuit 120. For example, the linearity controller 122 may receive operational mode indicators from the transceiver 104 and the transceiver 106, such as to indicate a transmission mode of a transceiver or a non-transmission mode of a transceiver. The linearity controller 122 can then determine a level of bias current to apply to the antenna match circuit 120 based on the operational modes of the respective transceivers and the linearity data 124. Once the level of bias current to apply is determined, the linearity controller 122 can initiate the drive circuit 126 to apply the determined level of bias current to the antenna match circuit 120.

Different levels of bias current can be applied to the antenna match circuit 120 to vary a linearity of the antenna match circuit and/or to tune the antenna 116. For example, an increased level of bias current can be applied to increase a linearity of the antenna match circuit 120 effective to reduce an amplitude of intermodulated signals that are received by a receiver. Alternatively or in addition, one level of bias current may be effective to tune the antenna 116 to receive signals associated with the first transceiver 104, and another level of bias current may be effective to tune the antenna 116 to receive signals associated with the second transceiver 106. An example of a current drive circuit implementation is described with reference to FIG. 4. This example system 100 is but one possible implementation of a multi-transceiver wireless device, the components of which may be substituted, duplicated, altered, or otherwise reconfigured to provide other various implementations in which concepts of the present disclosure may be embodied.

Figure 2:
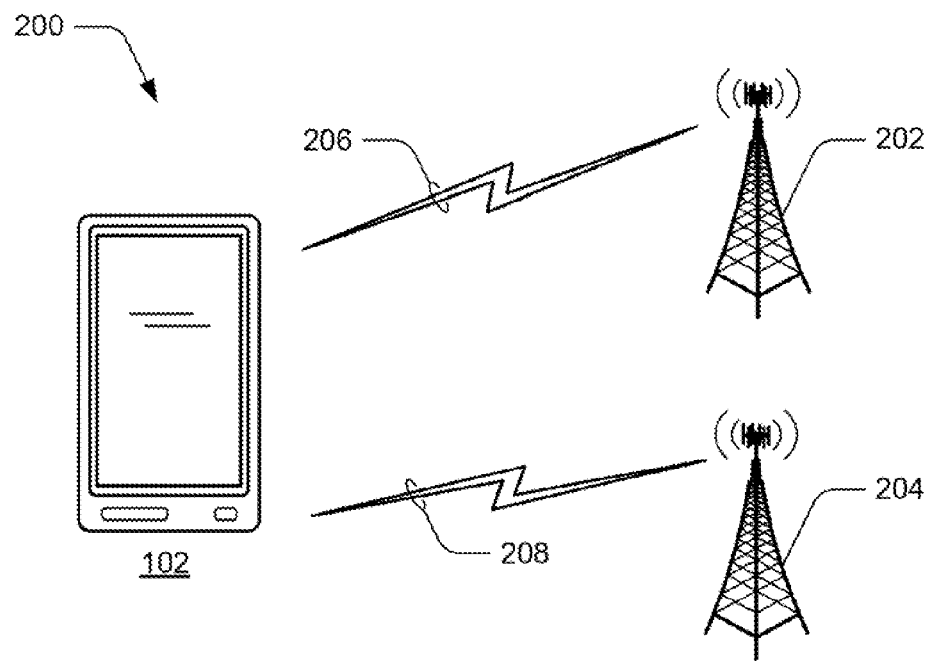
FIG. 2 illustrates an example network environment in which embodiments of variable antenna match linearity may be implemented.

FIG. 2 illustrates an example network environment 200 in which embodiments of variable antenna match linearity can be implemented. As shown in FIG. 2, the example network environment 200 includes a base station 202 and a base station 204 (e.g., node B or enhanced node B), which provide connectivity with respective wireless networks (not shown). The wireless networks associated with the base station 202 and the base station 204 provide access to various voice and/or data services. The base station 202 or the base station 204 may be configured to support any suitable communication protocol or standard, such as an LTE, CDMA 1xRTT, CDMA EVDO, GSM, WCDMA, UMTS, and the like. The base station 202 or the base station 204 may also implement a multiple-input multiple-output (MIMO) communication scheme in which multiple uplink or downlink data streams are communicated concurrently. In some embodiments, the base station 202 is configured to provide voice service in accordance with the CDMA 1xRTT standard and the base station 204 is configured to provide data services in accordance with the LTE standard.

When a user of the wireless device 102 initiates a voice data session (e.g., a voice phone call), the transceiver 104 may communicate the voice data with the base station 202 via a wireless link 206. The wireless link 206 includes signals transmitted to and/or received from the base station 202. These signals may be transmitted and/or received in one or more frequency bands, such as a single time division duplex (TDD) frequency band (e.g., LTE band 33) or two frequency division duplex (FDD) frequency bands (e.g., uplink and downlink bands of LTE band 5). When the user of the wireless device 102 initiates a non-voice data session (e.g., accessing the Internet or other data services), the transceiver 106 may communicate the non-voice data with the base station 204 via a wireless link 208. These signals may be transmitted or received in one or more frequency bands, such as a single TDD frequency band (e.g., LTE band 43) or two FDD frequency bands (e.g., uplink and downlink bands of LTE band 13).

In certain aspects, the transceiver 104 and the transceiver 106 may transmit signals in adjacent or proximate frequency bands. For example, the transceiver 104 may transmit voice data in LTE band 5, having transmit channels in a range of 824 to 849 MHz and receive channels in a range of 869 to 894 Mhz, and the transceiver 106 may transmit non-voice data in LTE band 13, having transmit channels in a range of 777 to 787 MHz and receive channels in a range of 704 to 716 MHz, during concurrent voice and data sessions, such as when implementing simultaneous voice and LTE (SVLTE). The transmit signals can couple into antenna match circuit 120 either directly from antenna switch 118, or in the case of separate antennas 112, 114 transmit signals, can couple into an antenna match circuit via antenna to antenna coupling. The transmit signals are intermodulated in the antenna match circuit 120. Accordingly, the linearity controller 122 can determine whether a frequency of the intermodulated signal is within a respective receive band of the transceiver 104 or the transceiver 106. When the frequency of the intermodulated signal is within one of the respective receive bands with sufficient amplitude, the linearity controller 122 can increase a linearity of the antenna match circuit to reduce an amplitude of the intermodulated signal. This can be effective to prevent the intermodulated signal from de-sensing or blocking a receiver of the transceiver 104 or the transceiver 106.

Figure 3:
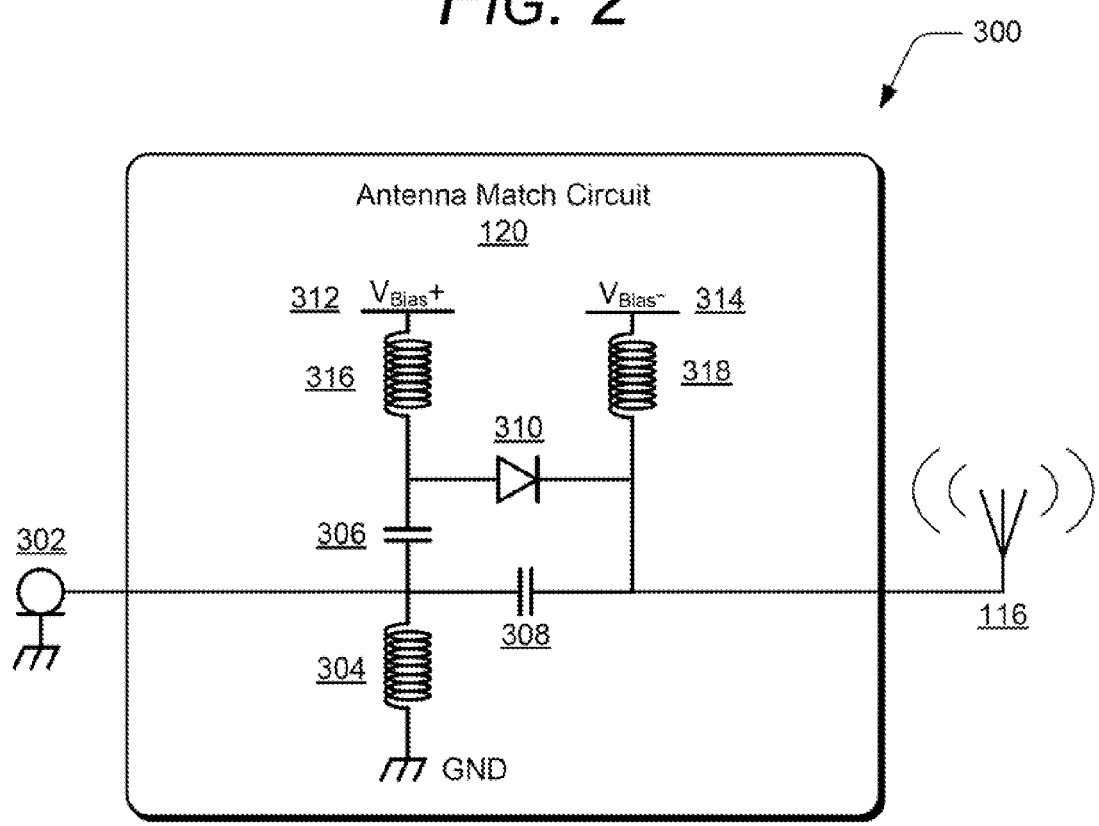
FIG. 3 illustrates a representation of an antenna match circuit implemented in an example wireless device according to some embodiments of variable antenna match linearity.

FIG. 3 illustrates a representation 300 of an antenna match circuit that can be implemented in the example wireless device 102 and operably coupled to the antenna 116 in embodiments of variable antenna match linearity. The antenna match circuit 120 is also coupled to the antenna switch 118 via coupler 302, which may have a nominal impedance of fifty (50) ohms or seventy-five (75) ohms. The antenna match circuit 120 includes an inductor 304, a capacitor 306, and a series capacitor 308, which are configured to match an impedance of the antenna 116 to the coupler 302. The antenna match circuit 120 also includes PIN diode 310, which is a diode that includes a wide lightly doped intrinsic region between p-type and n-type regions. The PIN diode 310 may function like a radio frequency (RF) switch or variable component, the various characteristics (e.g., linearity or impedance) of which can be varied by applying different amounts of bias current via voltage sources $V_{Bias+}$ 312 and $V_{Bias-}$ 314. The PIN diode 310 is coupled to $V_{Bias+}$ 312 and $V_{Bias-}$ 314 by blocking an inductor 316 and blocking an inductor 318, respectively, which provide high frequency isolation for the antenna match circuit 120.

When a difference between $V_{Bias+}$ 312 and $V_{Bias-}$ 314 is less than a forward voltage of PIN diode 310, the PIN diode 310 provides a high impedance signal path which effectively isolates capacitor 306. The high impedance signal path reduces an equivalent capacitance between coupler 302 and antenna 116 effective to improve signal transfer in a higher frequency band. Conversely, if the voltage at $V_{Bias+}$ 312 exceeds the voltage at $V_{Bias-}$ 314 by an amount such that PIN diode 310 is forward biased, PIN diode 310 then provides a low impedance signal path which effectively connects capacitor 306 and capacitor 308 in parallel. The low impedance path increases the equivalent capacitance between coupler 302 and antenna 116 effective to improve signal transfer in a lower frequency band. By so doing, the antenna matching circuit 120 can be controlled to maximize signal transfer between coupler 302 and antenna 116 depending on a channel and/or frequency.

Alternately or additionally, increasing the voltage difference between $V_{Bias+}$ 312 and $V_{Bias-}$ 314 above the forward bias threshold of PIN diode 310 increases an amount of forward bias current. This may have a minimal effect on the diode impedance, yet can significantly improve the diode linearity. Thus, under conditions when both transmit signals are present, the bias current applied to PIN diode 310 may be increased effective to reduce intermodulation distortion. This is but one implementation of the antenna match circuit 120, and other implementations may include any suitable combination of passive and/or active components to enable various aspects described herein.

In some embodiments, components of the antenna match circuit 120 are implemented to enable tuning the antenna 116 for communication in multiple frequency bands. Values of the inductor 304, capacitor 306, and series capacitor 308 may be selected to optimize tuning the antenna 116 for different frequency bands when different levels of bias current are applied to the PIN diode 130. For example, applying one level (e.g., approximately zero milliamps) of bias current to the PIN diode 130 can optimize tuning the antenna 116 for reception of signals in a receive band of the first transceiver 104 (e.g., LTE band 5). Applying another level of bias current (e.g., approximately one to two milliamps) to the PIN diode 130 can optimize tuning the antenna 116 for reception of signals in a receive band of the second transceiver 106 (e.g., LTE band 13).

Increasing a level of bias current applied to the PIN diode 310 can also increase a linearity of the antenna match circuit 120, effective to reduce intermodulation distortion between transmitted signals from the transceiver 104 and the transceiver 106 that are received as feedback at the antenna 116. For example, increasing a level of bias current applied to the PIN diode 310 (e.g., to approximately three to fifteen milliamps) can reduce an amplitude of an intermodulated signal to prevent receiver de-sensing or blocking. From an antenna designer's standpoint, increasing the linearity of the antenna match circuit 120 can enable reduced isolation requirements, such as between the antenna 116 and the other transmitting antennas (e.g., antenna 112 or antenna 114) which can, in turn, enable antenna designs having better radiation performance.

Figure 4:
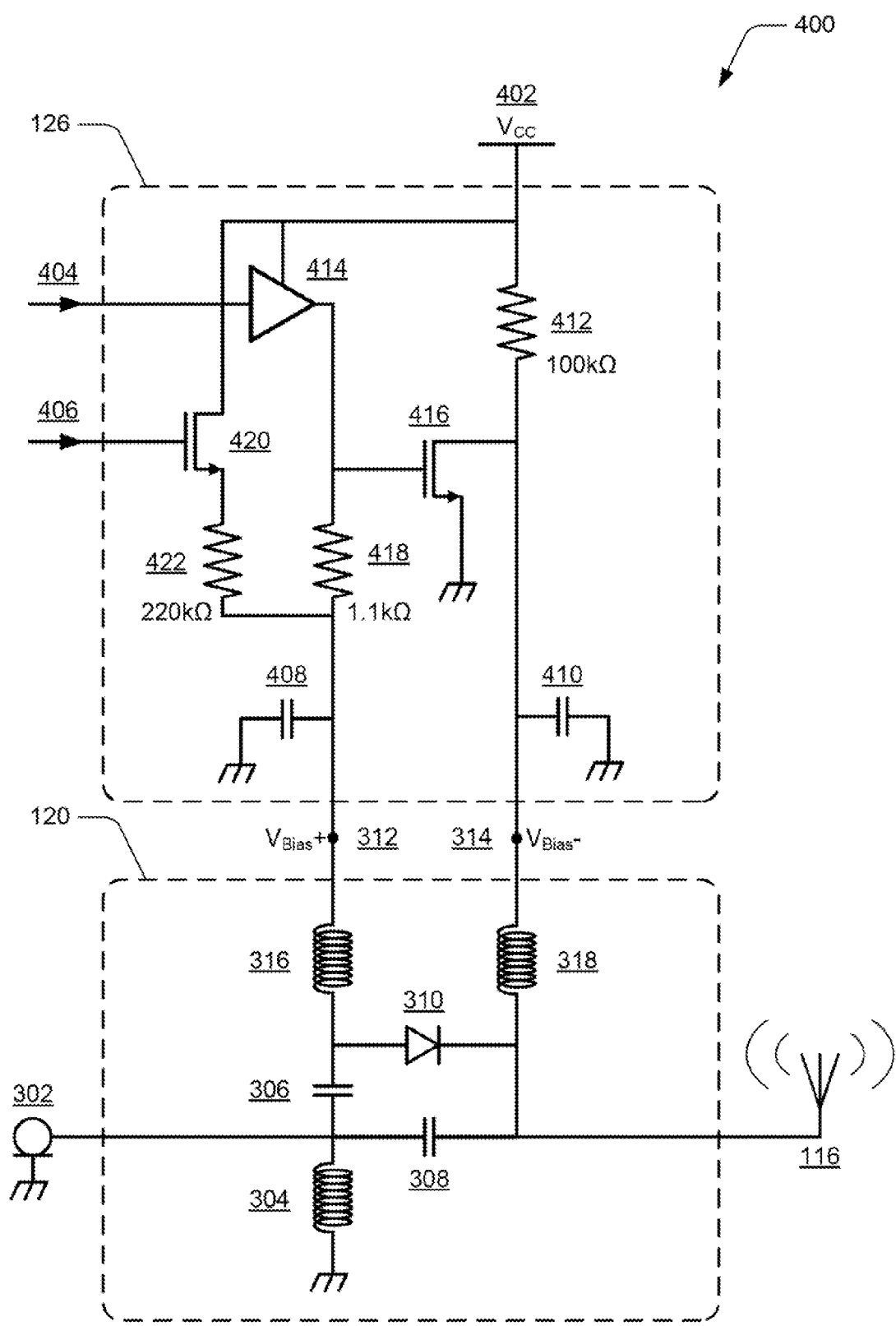
FIG. 4 illustrates a representation of a current drive circuit implemented in an example wireless device in embodiments of variable antenna match linearity.

FIG. 4 illustrates a representation 400 of a current drive circuit that can be implemented in the example wireless device 102 and coupled to the antenna match circuit 120 to which varying levels of bias current are applied in embodiments of variable antenna match linearity. The current drive circuit 126 (drive circuit 126) receives power from $V_{CC}$ 402 and applies bias current to the antenna match circuit based on a control signal 404 and a control signal 406. A filter capacitor 408 and a filter capacitor 410 prevent high frequency signals from coupling through the drive circuit 126 to other components of the wireless device 102.

The current drive circuit 126 applies different levels of bias current to the antenna match circuit 120 based on the control signal 404 and the control signal 406. When both of the controls signals 404 and 406 are asserted low (e.g., to zero volts), a first level of bias current is applied to the PIN diode 310 (e.g., zero milliamps), which in this case is reversed biased by voltage $V_{CC}$ 402 applied through a resistor 412. When the control signal 404 is activated or asserted high to 3.3 volts (3.3 V), a regulator 414 applies voltage to bias a resistor 418 and activate a switch 416. The switch 416 then grounds a cathode of the PIN diode 310 which permits a second level of bias current to flow from the regulator 414 through a bias resistor 418 to an anode of the PIN diode 310. This second level of bias current may be within a range of approximately one half to three milliamps (0.5 mA-3 mA), where the range includes the one half and three milliamps. When the control signal 406 is activated or asserted high to 3.3 volts (3.3 V), the switch 420 applies $V_{CC}$ 402 to a bias resistor 422, which applies a third level of bias current to the PIN diode 310. This third level of bias current may be within a range of approximately three to fifteen milliamps (3 mA-15 mA), where the range includes the three and fifteen milliamps.

In some aspects, the linearity controller 122 selectively activates the control signal 404 and the control signal 406 to apply different levels of bias current to the antenna match circuit 120. The linearity controller 122 can determine a level of bias current ($I_{BIAS}$) to apply to the antenna match circuit 120 based on operational modes of the wireless transceiver 104 and the wireless transceiver 106. For example, the linearity controller 122 can activate the control signal 404 (CS 404) and the control signal 406 (CS 406) based on linearity data 124, an example of which is illustrated below in Table 1.

In some embodiments, applying the first or the second level of bias current to the antenna match circuit 120 can optimize tuning the antenna 116 for reception of signals in a particular frequency band. For example, when the antenna 116 is configured as a diversity receive antenna for the transceiver 104, applying the first level of bias current optimizes tuning the antenna 116 to receive signals in LTE band 5. When the antenna 116 is configured for MIMO reception for the transceiver 106, applying the second level of bias current optimizes tuning the antenna 116 to receive MIMO signals in LTE band 13. The first and the second levels of bias current can be lower levels of bias current that consume less power in a wireless device. Accordingly, when one transceiver of the wireless device is transmitting, less power is consumed by the antenna match circuit, which may conserve battery power of the wireless device and/or extend a run-time of the wireless device.

In implementations, the linearity controller 122 can determine when both the transceiver 104 and the transceiver 106 are transmitting, either via the separate antennas 112 (e.g., in LTE band 5) and 114 (e.g., in LTE band 13), respectively, or via the common antenna 116. Responsive to the determination, the linearity controller 122 can apply the third or highest level of bias current to the PIN diode 310 to increase a linearity of the antenna match circuit 130, through which either receiver may receive signals. Increasing the linearity of the antenna match circuit 120 is effective to minimize intermodulation distortion of the signals transmitted by the transceiver 104 and the transceiver 106 that are unintentionally received by the antenna 116. Minimizing the intermodulation distortion of the transmitted signals can be effective to prevent or minimize a receiver of the transceiver 104 and/or the transceiver 106 from being desensitized or blocked.

Figure 5:
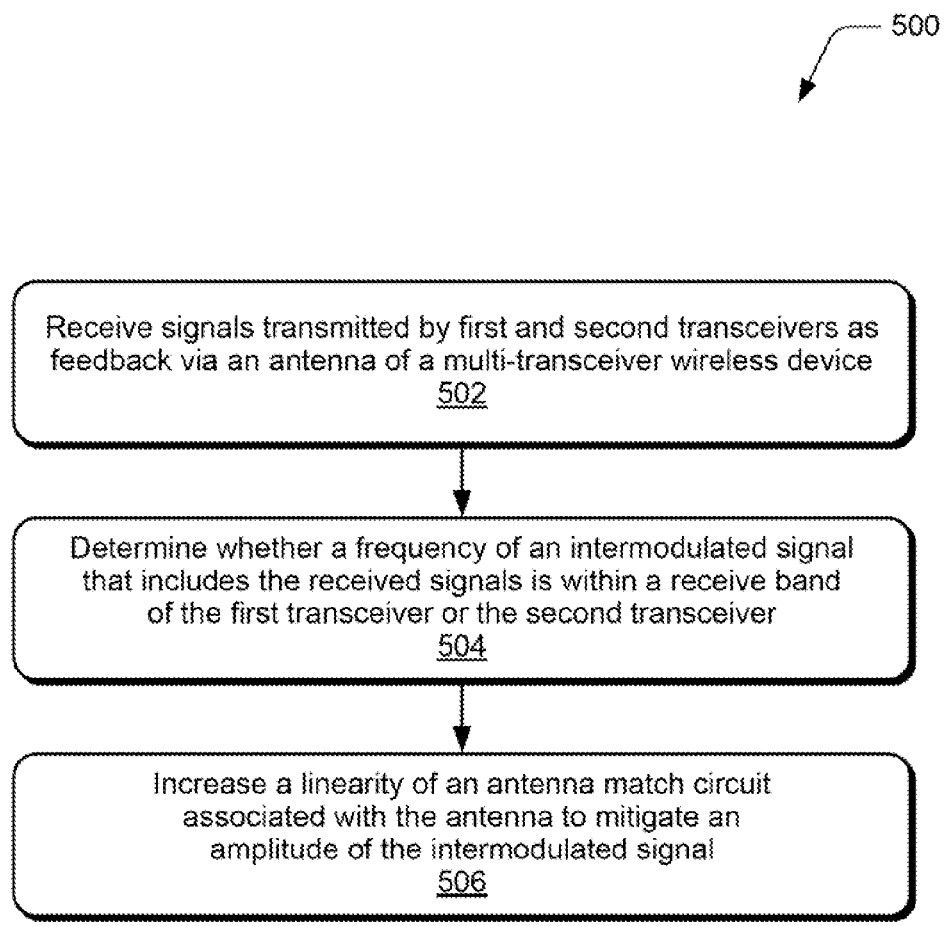
FIG. 5 illustrates an example method of variable antenna match linearity in accordance with one or more embodiments.

FIG. 5 illustrates example method(s) 500 of variable antenna match linearity. The order in which the method is described is not intended to be construed as a limitation, and any number or combination of the described method operations can be performed in any order to perform a method, or an alternate method for variable antenna match linearity.

At 502, signals transmitted by first and second transceivers of a multi-transceiver wireless device are received as feedback via an antenna of the device. The antenna can be coupled to either transceiver by an antenna switch to enable the coupled transceiver to receive signals. By way of example, the wireless device 102 (FIG. 1) operating in an SVLTE mode in which transmissions of the transceiver 104 in LTE band 5 and the transceiver 106 in LTE band 13 are received by the antenna 116. These received transmissions may produce an intermodulated signal (e.g., as a third-order intermodulation distortion product) due to non-linearities of the antenna match circuit 120 or other non-linear RF components of the wireless device 102.

At 504, a determination is made as to whether a frequency of an intermodulated signal that includes the transmissions of the first and second transceivers is within a respective receive band of the first transceiver or the second transceiver. The intermodulated signal may desensitize or block a receiver of the transceiver 104 and/or the transceiver 106, which may prevent or disrupt communications of a respective receiver. In

TABLE 1

Example Linearity Data

| Active Transmitter | $V_{cc}$ | CS 404 | CS 406 | Reg 414 | Sw 416 | Sw 420 | $V_{bias}$ | $I_{bias}$ |
|---|---|---|---|---|---|---|---|---|
| Standby (Neither) | 0 V | Low | Low | Off | Off | Off | 0 V | 0 mA |
| Transceiver 104 | 3.3 V | Low | Low | Off | Off | Off | −3.3 V | 0 mA |
| Transceiver 106 | 3.3 V | High | Low | On | On | Off | 0.8 V | 2 mA |
| Both Transceivers | 3.3 V | High | High | On | On | On | 0.8 V | 12 mA | the context of the current example, transmissions in transmit bands of LTE band 5 and LTE band 13 cause intermodulated signals in respective receive bands of LTE band 5 and LTE band 13. In such cases, LTE band 5 and LTE band 13 receive channels can experience desense from $3^{rd}$ order intermodulation (IM) as shown below in Equation 1.

IM Frequency=($m*1^{st}$ Transmit Frequency)−($n*2^{nd}$ Transmit Frequency)   Equation 1. Example Intermodulation Frequency In the context of the present example, m=2, n=1, and an intermodulation signal may occur in a receive frequency if m times the first transmit frequency minus n times the second transmit frequency is equal to the receive frequency. Accordingly, the linearity controller 122 can determine that the intermodulated signal is within a receive band of the first transceiver 104 and/or the second transceiver 106.

Linearity controller 122 may also determine if the intermodulation power level is sufficient to cause desensitization. For example, a third order intermodulation level caused a nonlinear circuit having third order intercept level of IP3, caused by two transmit signals is shown below in Equation 2 (all units dBm).

$IM_{Third\ Order}$= $Power_1$+2*$Power_2$−IP3   Equation 2. Example Intermodulation Power Level In the context of this equation, $Power_1$ is a power level of a first transmit signal, $Power_2$ is a power level of a second transmit signal, and $IM_{Third\ Order}$ is a power level of the intermodulation. Linearity controller 122 can compare $IM_{Third\ Order}$ to a sensitivity level of a receiver minus the signal to noise ratio to determine or estimate an amount of desensitization for the receiver.

At 506, a linearity of an antenna match circuit associated with the antenna is increased to mitigate an amplitude of the intermodulated signal. In implementations, the antenna match circuit includes a PIN diode, and increasing a level of bias current applied to the PIN diode is effective to increase the linearity of the antenna match circuit. In such cases, the level of bias current applied to the PIN diode may be increased from a range of approximately zero to four milliamps to a range of approximately five to twelve milliamps. Increasing the linearity of the antenna match circuit may shift a third-order intercept point of the antenna match circuit and mitigate the amplitude of the intermodulated signal. The linearity controller 122 causes the drive circuit 126 to apply approximately twelve milliamps or more of bias current to the PIN diode 310 of the antenna match circuit 120. This is effective to prevent the intermodulated signal from blocking the receiver of transceiver 106, which enables transceiver 106 to receive MIMO signals via antenna 116.

Alternately or additionally, another level of bias current (e.g., zero to four milliamps) may be applied to a PIN diode if a frequency of the intermodulated signal is outside of a respective receive band or if the amplitude of the intermodulated signal is less than a minimum reception level of a respective receiver. For example, a level of bias current applied to the PIN diode may be maintained or reduced to one half to three milliamps responsive to determining that a frequency of the intermodulated signal is outside of the respective receive bands of the first and second transceivers.

Figure 6:
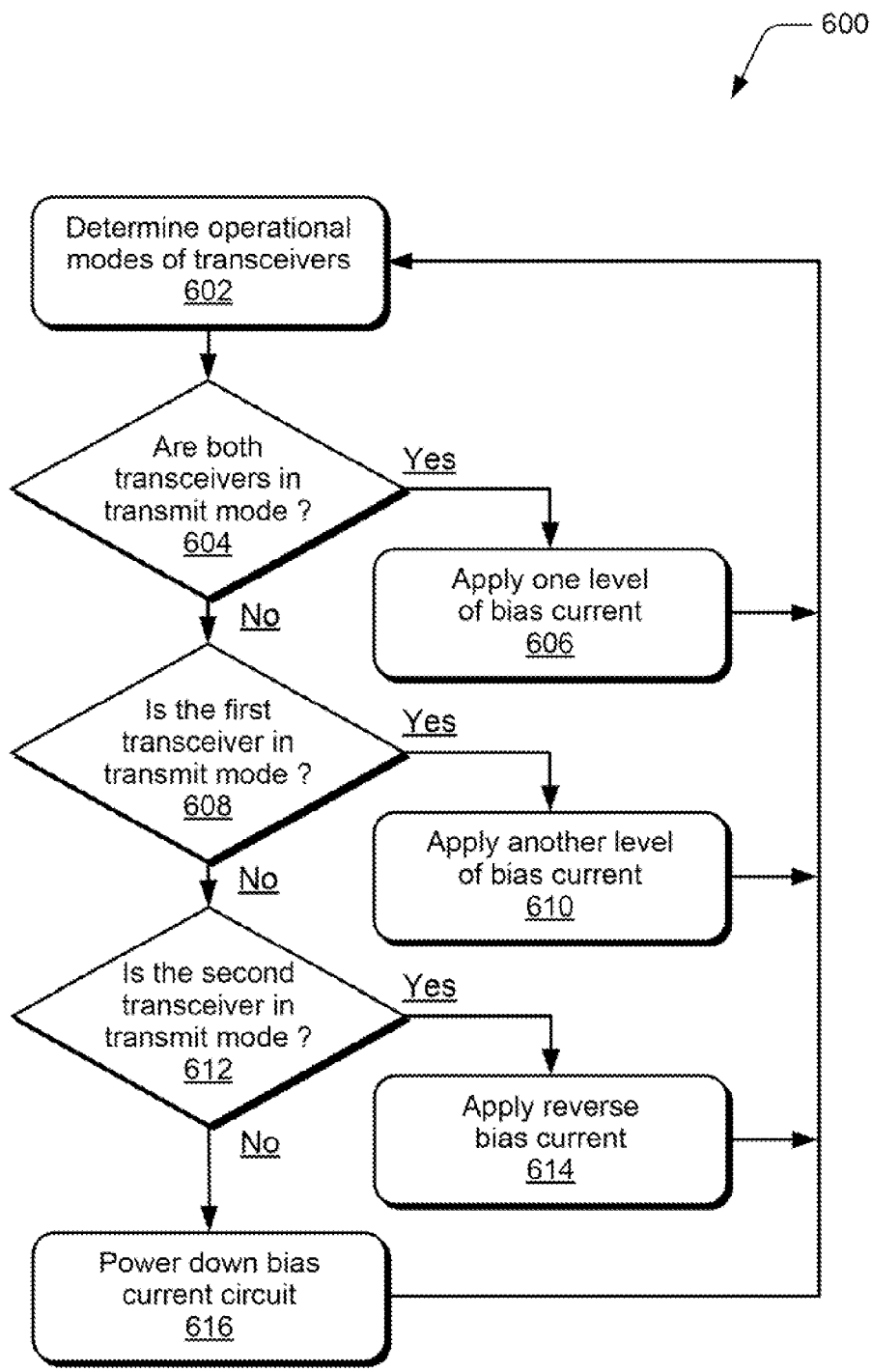
FIG. 6 illustrates another example method of variable antenna match linearity in accordance with one or more embodiments.

FIG. 6 illustrates another example method(s) 600 of variable antenna match linearity. The order in which the method is described is not intended to be construed as a limitation, and any number or combination of the described method operations can be performed in any order to perform a method, or an alternate method for variable antenna match linearity.

At 602, operational modes of first and second transceivers of a multi-transceiver wireless device are determined. The operational modes may include any one of a transmit mode, receive mode, standby mode, and so on. For example, the linearity controller 122 implemented in the wireless device 102 (FIG. 1) determines when one or both of the transceiver 104 and the transceiver 106 are in a transmit mode. In some aspects, a level of bias current applied to the PIN diode 310 of the antenna match circuit 120 may be based on the operational modes of the respective transceivers.

At 604, a determination is made as to whether both transceivers of the wireless device are in a transmit mode. The first and second transceivers of the wireless device may be concurrently communicating voice and non-voice data over respective wireless networks or frequency bands. For example, the wireless device 102 may use the first transceiver 104 to communicate voice data over the wireless link 206, and use the second transceiver 106 to communicate non-voice data over the wireless link 208 as shown in FIG. 2. Alternately, only one or neither of the transceivers of the wireless device may be in a transmit mode.

Generally, a determination is made at block 604 as to whether desensitization can or will occur. Alternately or additionally, a determination can be made as to whether the transmit frequencies are such that intermodulation can occur at a receive frequency and/or whether transmit power levels are such that intermodulation will exceed a threshold level for receiver desensitization. These are but example conditions on which linearity controller 122 may act, and may be combined or implemented in any suitable order or combination.

If both the first and second transceivers of the wireless device are in respective transmit modes (i.e., yes from 604), then at 606, a level of bias current is applied to a PIN diode of an antenna match circuit associated with an antenna of the wireless device. The antenna may receive signals transmitted by the first and second transceivers as feedback, which may block or desensitize a receiver operably coupled with the antenna. The level of bias current may be the highest level of bias current applied to the PIN diode 310 of the antenna match circuit 120. Applying the highest level of bias current to the PIN diode increases a linearity of the antenna match circuit, which can reduce an amplitude of an intermodulated signal caused by the transmissions of the first and second transceivers. This can be effective to prevent the intermodulated signal from de-sensing or blocking the receiver that is operably coupled with the antenna.

If both the first and second transceivers of the wireless device are not in the respective transmit modes (i.e., no from 604), then at 608, a determination is made as to whether a first of the transceivers of the multi-transceiver wireless device is in a transmit mode. For example, the transceiver 106 may be operational in an LTE transmission mode for transmitting non-voice data over the wireless link 208 in LTE band 13. If the first transceiver is in a transmit mode (i.e., yes from 608), then at 610, another level of bias current is applied to the PIN diode of the antenna match circuit associated with the antenna. The other level of bias current can be applied to optimize tuning the antenna to receive signals in a particular frequency band. For example, applying approximately two milliamps of current to the PIN diode 310 may optimize tuning the antenna 116 to receive signals in LTE band 13.

If the first transceiver of the wireless device is not in a respective transmit mode (i.e., no from 608), then at 612, a determination is made as to whether a second of the transceivers of the multi-transceiver wireless device is in a transmit mode. For example, transceiver 104 may be operational in an EVDO transmission mode for transmitting voice data over the wireless link 206 in LTE band 5. If the second transceiver is in a transmit mode (i.e., yes from 612), then at 614, reverse bias current (0 mA) is applied to the PIN diode of the antenna match circuit associated with the antenna. The reverse bias current can be applied to optimize tuning of the antenna to receive signals in another particular frequency band. For example, approximately zero milliamps of current at the PIN diode 310 (e.g., reverse biasing) optimizes tuning the antenna 116 to receive signals in LTE band 5. In some cases, not applying voltage to PIN diode 310 is effective to cause a bias current of zero milliamps.

If the second transceiver of the wireless device is not in a respective transmit mode (i.e., no from 612), then at 616, a bias current circuit is powered down to conserve energy use in the wireless device. Powering down the bias current circuit can include powering down a supply circuit or voltage rail associated with the transceivers or other RF components of the wireless device. Powering down the bias current circuit may also prevent leakage current, which can drain a battery of the wireless device. The method then returns to 602 for subsequent iterations of varying a level of bias current applied to the PIN diode of the antenna match circuit. By applying higher levels of bias current when needed, such as when the transceivers are concurrently transmitting, power of the wireless device may be conserved to increase a run-time of the wireless device.

Figure 7:
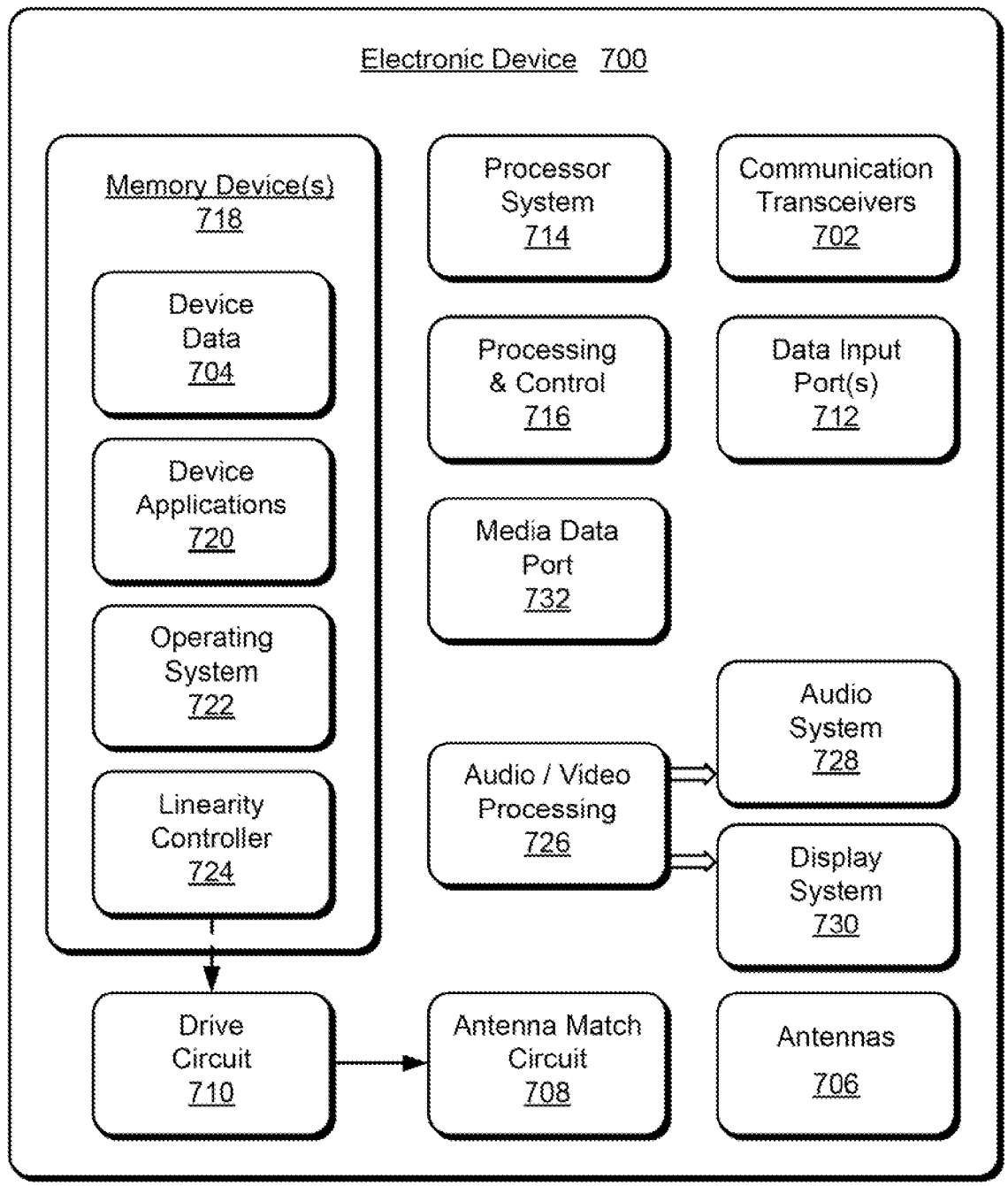
FIG. 7 illustrates various components of an example electronic device that can implement embodiments of variable antenna match linearity.

FIG. 7 illustrates various components of an example electronic device 700 that can be implemented as a wireless device as described with reference to any of the previous FIGS. 1-6. The device may be implemented as any one or combination of a fixed or mobile device, in any form of a consumer, computer, portable, user, communication, phone, navigation, gaming, messaging, Web browsing, paging, media playback, and/or other type of electronic device, such as the wireless device 102 described with reference to FIG. 1.

The electronic device 700 includes communication transceivers 702 that enable wired and/or wireless communication of device data 704, such as received data and transmitted data. Transceivers 702 may be embodied as two or more wireless transceivers, such as the wireless transceivers 104, 106 described with reference to FIG. 1. Example communication transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN, 3GPP-compliant) radios for cellular telephony, wireless metropolitan area network (WMAN) radios compliant with various IEEE 802.16 (WiMAX™) standards, and wired local area network (LAN) Ethernet transceivers.

In embodiments, the electronic device 700 includes antennas 706, such as the antennas 112, 114, and 116, and includes an antenna match circuit 708, such as the antenna match circuit 120 described with reference to FIG. 1. Antennas 706 and the antenna match circuit 708 can be implemented to facilitate communication via the communication transceivers 702, such as when the communication transceivers are implemented as CDMA and LTE transceivers. The electronic device 700 also includes a drive circuit 710, such as the drive circuit 126 described with reference to FIG. 1, that applies variable levels of bias current to the antenna match circuit 708 (or components thereof). For example, when the communication transceivers 702 are multi-transmitter operational in LTE band 5 and LTE band 13, the drive circuit 710 applies an increased level of bias current to a PIN diode of the antenna match circuit 708, which increases a linearity of the antenna match circuit for multi-transmitter operation.

The electronic device 700 may also include one or more data input ports 712 via which any type of data, media content, and/or inputs can be received, such as user-selectable inputs, messages, music, television content, recorded video content, and any other type of audio, video, and/or image data received from any content and/or data source. The data input ports 712 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 700 of this example includes a processor system 714 (e.g., any of microprocessors, controllers, and the like), or a processor and memory system (e.g., implemented in an SoC), which process computer-executable instructions to control operation of the device. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 716. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 700 also includes one or more memory devices 718 that enable data storage, examples of which include random access memory (RAM), non-volatile memory (e.g., read-only memory (ROM), flash memory, EPROM, EEPROM, etc.), and a disk storage device. A memory device 718 provides data storage mechanisms to store the device data 704, other types of information and/or data, and various device applications 720 (e.g., software applications). For example, an operating system 722 can be maintained as software instructions with a memory device and executed by the processor system 714. In embodiments, the electronic device 700 includes a linearity controller 724, such as the linearity controller 122 described with reference to FIG. 1. Although represented as a software implementation, the linearity controller may be implemented as any form of a control application, software application, signal-processing and control module, firmware that is installed on the device, a hardware implementation of the controller, and so on.

The electronic device 700 also includes an audio and/or video processing system 726 that processes audio data and/or passes through the audio and video data to an audio system 728 and/or to a display system 730. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 732. In implementations, the audio system and/or the display system are external components to the electronic device. Alternatively or in addition, the display system can be an integrated component of the example electronic device, such as part of an integrated touch interface.

Although embodiments of variable antenna match linearity have been described in language specific to features and/or methods, the subject of the appended claims is not necessarily limited to the specific features or methods described. Rather, the specific features and methods are disclosed as example implementations of variable antenna match linearity.

The invention claimed is:

1. A method implemented in a multi-transceiver wireless device, the multi-transceiver wireless device including a first transceiver, a second transceiver, a controller, an antenna match circuit, and an antenna, the antenna selectively coupled to the first and second transceivers through the antenna match circuit, the antenna match circuit including a in diode, the method comprising:
determining, by the controller, respective operational modes of the first transceiver and the second transceiver;
applying a first level of bias current to the PIN diode of the antenna match circuit when determined that the first and the second transceivers are each in respective transmission modes;
applying a second level of bias current to the PIN diode of the antenna match circuit when determined that the first transceiver is in the respective transmission mode and the second transceiver is in a respective non-transmission mode, wherein linearity of the antenna match circuit when the first level of bias is applied is increased relative to the linearity of the antenna match circuit when the second level of bias current is applied; and
applying a third level of bias current to the PIN diode of the antenna match circuit when determined that the first transceiver is in a respective non-transmission mode and the second transceiver is in the respective transmission mode.

2. The method as recited in claim 1, further comprising applying the second level of bias current to the PIN diode of the antenna match circuit while the first and the second transceivers are each in respective transmission modes in response to determining that a frequency of an intermodulated signal caused by concurrent transmissions of the first and the second transceivers is outside of respective receive bands of the first transceiver and the second transceiver.

3. The method as recited in claim 1, further comprising applying the second level of bias current to a PIN diode of the antenna match circuit while the first and the second transceivers are each in respective transmission modes in response to determining that an amplitude of an intermodulated signal caused by concurrent transmissions of the first and the second transceivers is less than respective minimum levels of reception of the first transceiver and the second transceiver.

4. The method as recited in claim 1, wherein:
the wireless device is configured for communication in accordance with a long term evolution (LTE) standard:
the first transceiver is configured for data communication in LTE band 13; and
the second transceiver is configured for voice communication in band 5.

5. A method implemented in a multi-transceiver wireless device, the method comprising:
determining respective operational modes of a first transceiver and a second transceiver of the wireless device; and:
applying a first level of bias current to a PIN diode of an antenna match circuit when determined that the first and the second transceivers are each in respective transmission modes, the antenna match circuit associated with an antenna via which one of the first transceiver or the second transceiver receives signals;
applying a second level of bias current to the PIN diode of the antenna match circuit when determined that the first transceiver is in the respective transmission mode and the second transceiver is in a respective non-transmission mode; and
applying a third level of bias current to the PIN diode of the antenna match circuit when determined that the first transceiver is in a respective non-transmission mode and the second transmission mode, wherein applying the first level of bias current to the PIN diode increases a linearity of the antenna match circuit effective to reduce an amplitude of an intermodulated signal caused by concurrent transmissions of the first and second transceivers.

6. The method as recited in claim 5, wherein the amplitude of the intermodulated signal is reduced effective to prevent a receiver of the first transceiver or the second transceiver from being desensitized or blocked.

7. The method as recited in claim 5, wherein a frequency of the intermodulated signal caused by concurrent transmissions of the first and second transceivers is within one of a respective receive band of the first transceiver or the second transceiver.

8. A method implemented in a multi-transceiver wireless device, the method comprising:
determining respective operational modes of a first transceiver and a second transceiver of the wireless device; and:
applying a first level of bias current to a PIN diode of an antenna match circuit when determined that the first and the second transceivers are each in respective transmission modes, the antenna match circuit associated with an antenna via which one of the first transceiver or the second transceiver receives signals;
applying a second level of bias current to the PIN diode of the antenna match circuit when determined that the first transceiver is in the respective transmission mode and the second transceiver is in a respective non-transmission mode; and
applying a third level of bias current to the PIN diode of the antenna match circuit when determined that the first transceiver is in a respective non-transmission mode and the second transceiver is in the respective transmission mode, wherein the first level of bias current is within an approximate range of three to fifteen milliamps, the second level of bias current is within an approximate range of one half to three milliamps, and the third level of bias current is approximately zero milliamps.

9. A multi-transceiver wireless device comprising:
a first transceiver;
a second transceiver;
a controller coupled to the first and second transceivers;
an antenna match circuit, the antenna match circuit including a pin diode; and
an antenna coupled to the antenna match circuit;

wherein the controller determining the respective operational modes of the first transceiver and the second transceiver, the controller controlling application of a first level of bias current to the PIN diode when the first and the second transceivers are each in respective transmission modes, the controller controlling application of a second level of bias current to the PIN diode when the first transceiver is in the respective transmission mode and the second transceiver is in a respective non-transmission mode, the linearity of the pin diode when the first level of bias is applied is increased relative to the linearity of the pin diode when the second level of bias current is applied, and the controller controlling application of a third level of bias current to the PIN diode of the antenna match circuit when the first transceiver is in a respective non-transmission mode and the second transceiver is in the respective transmission mode, the third level of bias different from the first level of bias and the second level of bias.

10. The device of claim 9, wherein the antenna match circuit further includes a first port, a first impedance component, and a second impedance component, the pin diode coupled to the first and second impedance elements and selectively changing the impedance of the match circuit.

11. The device of claim 9, wherein the first impedance component comprises a capacitor, the second impedance component comprises a capacitor, the pin diode connected to the first and second capacitors.

12. The device of claim 9, further including a drive circuit coupled to the controller and the antenna match circuit, the drive circuit responsive to the controller to provide the first, second, and third levels of bias the pin diode.

13. The device of claim 9, further including an antenna switch, the antenna switch coupled between the first and second transceivers and the antenna match circuit.

\* \* \* \* \*